United States Patent [19]

Kollross

[11] 3,805,329
[45] Apr. 23, 1974

[54] INSTALLATION FOR THE MANUFACTURE OF SAUSAGE, IN PARTICULAR RAW SAUSAGE

[76] Inventor: Günter Kollross, Wallerstadter Weg 20, 6081 Dornheim, Germany

[22] Filed: Apr. 27, 1972

[21] Appl. No.: 248,208

[30] Foreign Application Priority Data
May 15, 1971   Germany............................ 2124282

[52] U.S. Cl. ................................................. 17/33
[51] Int. Cl. ........................................... A22c 11/00
[58] Field of Search ............... 17/41, 42, 35, 33, 37, 17/49

[56] References Cited
UNITED STATES PATENTS

| | | | |
|---|---|---|---|
| 3,703,064 | 11/1972 | Lugiewicz............ | 17/41 X |
| 3,553,769 | 1/1971 | Myles.................. | 17/41 X |
| 3,396,426 | 8/1968 | Ziolko................. | 17/41 X |
| 3,659,317 | 5/1972 | Kupcikevicius...... | 17/41 X |

*Primary Examiner*—Louis G. Mancene
*Assistant Examiner*—D. L. Weinhold
*Attorney, Agent, or Firm*—Molinare, Allegretti, Newitt & Witcoff

[57] ABSTRACT

Apparatus for filling sausage casings with sausage filler. Sausage filler is fed through an outlet into one of a plurality of elongate nozzle members mounted with their axes parallel. The nozzles are moveable in a circular path to position the inlet of each nozzle sequentially in alignment with the outlet. A casing sealing device for sealing an open end of a casing is moveable longitudinally of a nozzle between a first position towards the inlet end of a nozzle and a second position away from the inlet end. An abutment is provided on the sealing device to urge the nozzle inlet against the outlet when the casing sealing device is moved into the first position. A sausage casing is placed over a nozzle and the nozzle is then rotated into position in alignment with the outlet. The sealing device is moved into the first position and the casing is filled by moving sausage filler from the outlet through the nozzle and into the casing. During the filling operation, the nozzle is urged against the outlet to maintain a seal between the outlet and nozzle inlet. After the sausage casing is filled, the sealing device is moved to the second position out of the way of the nozzles and a second nozzle, previously provided with a casing, is moved into alignment with the outlet for filling the second casing.

10 Claims, 5 Drawing Figures

INSTALLATION FOR THE MANUFACTURE OF SAUSAGE, IN PARTICULAR RAW SAUSAGE

BACKGROUND OF THE INVENTION

The invention relates to an apparatus for manufacturing sausage, particularly raw sausage, and having mounted in axially parallel relationship and spaced around the periphery of a rotatable disc, nozzles which, by intermittent rotation of the disc, can be sequentially moved to a position in front of the outlet of a sausage filling machine and can be pressed to bear in sealing-tight manner thereon.

Apparatus of this type is distinguished from other known constructions wherein the sausage mixture is fed to a turret head carrying the nozzles, through the hollow axis of rotation thereof, and is then passed through a rectangularly branching-off intermediate passage inside the turret head to a nozzle which happens to be in the filling position, by the fact that far less force is required to press the sausage mixture through the apparatus. On the other hand, the seal between the outlet from the filling machine and the nozzle which happens to be in line therewith requires, by reason of the still very high pressure at which the sausage mixture is forced into the casing, a particular sealing and locing means between the nozzle and the outlet, for which in a known apparatus a manually operable clamping arrangement is used. However, operation of this clamping device before and after further rotation of the disc requires additional time and labor, so that the advantage of providing a plurality of nozzles so that fresh sausage casings can be pulled on even during the filling process, is nullified.

There is already known a mechanically operated drawing-up and clipping device for closing off or sealing the filled sausage casing. The sealing device is located in front of a sausage-filling machine which is provided with a single nozzle, and to be so moveable such that this device, in its working position, engages over the end of the nozzle with an annular sausage casing holder which, during the filling process, holds the sausage casing on the nozzle and so guarantees a tightly stretched casing. After the drawing-up and clipping process which immediately follows the filling, the device is then, together with the casing holder, pivoted to the side so that a new sausage casing can be pulled onto the nozzle. Since the pulling-on of a new casing takes relatively considerable time, there is quite a lot of time lost between the individual filling process. Furthermore, this apparatus is capable of processing only relatively fine meat for Frankfurter-type and boiling sausages, since the short distance, due to the pivoting movement, by which the casing holder engages over the nozzle in the working position of the drawing-up and clipping device, is not sufficient for a compact distribution of also coarse sausage mixture in the casing, such as is used in the manufacture of raw sausages.

It is an object of the present invention to provide an apparatus of the type mentioned above so that the production increase attainable by simultaneously pulling-on and filling the sausage casings is utilized to the full, the filled sausage casings also being at the same time closed by clips in known manner.

BRIEF SUMMARY OF THE INVENTION

The foregoing and other objects which will be apparent to those having ordinary skill in the art are achieved according to the present invention by providing apparatus for filling sausage casings with sausage filler comprising, outlet means for introducing sausage filler into a sausage casing, a plurality of elongate nozzle members having their axes parallel and mounted for rotation in a circular path, means for moving the nozzles in the circular path to position a nozzle inlet in alignment with the outlet means for introducing the sausage filler into the nozzle, casing sealing means for sealing an open end of the sausage casing and moveable longitudinally of the nozzle between a first position towards the nozzle inlet and a second position away from the nozzle inlet, means for moving the casing sealing means between the first and second positions, and abutment means responsive to motion of the casing sealing means to urge the nozzle inlet against the sausage filler outlet when the casing sealing means is moved into the first position.

DETAILED DESCRIPTION

According to the invention, a conventional drawing-up and clipping device is located in known manner in front of the filling machine and is moveable by means of a power drive beween a casing release position and a working position. In the working position, a casing holder is positioned over a nozzle adjacent to the filling machine outlet. Several nozzles are provided on a rotatable disc and the drawing-up and clipping device is guided for displacement parallel with the axis of rotation of the disc on which the nozzles are mounted and is connected to a stop engageable with the periphery of the disc. In the working position of the drawing-up and clipping device, and by means of the power drive, the stop presses the relevant nozzle against the outlet of the filling machine. Thus, the invention utilizes the power drive for the reciprocating movement of the drawing-up and clipping device in the working position simultaneously to generate the pressure of application between nozzle and machine outlet which is necessary to produce a perfect seal, so that, by replacing the familiar pivoting of the drawing-up and clipping device by a linear movement in the direction of the length of the elongate nozzles, the advantage is at the same time obtained that the casing holder can be pushed as far as is desired over the nozzle so that coarse sausage mixture for raw sausage can be processed without difficulty.

Since on the other hand when processing finer sausage compositions, such an extensive engaging of the casing holder over the nozzle is not always expedient, the travel of the drawing-up and clipping device between the working and release positions is preferably variable. However, the farther the casing holder is pushed on to the nozzle, the greater must be the axial distance between the casing holder and the drawing-up and clipping tools in order to avoid these tools being hampered by the nozzle. However, in an advantageous development of the invention, this requirement is obviated in that the drawing-up and clipping tools, viewed in the direction of displacement of the device, are located immediately after the casing holder and the power drive is so constructed and controllable that the drawing-up and clipping device can, before reaching the release position, be maintained in an intermediate position in which the nozzle has just been moved out of the working range of the drawing-up and clipping tools, while the casing holder is still engaged around the end of the nozzle. As a result, it is possible to enclose virtually all the sausage composition emerging from the nozzle in the sausage casing during drawing-in and clipping off thus avoiding an excess of ejected sausage composition. It is expedient thereby for the filling machine to be so controlled that it discontinues further extrusion of sausage composition before this intermediate position is reached. This facilitates drawing-up and removes the risk of the sausage casing bursting during the drawing-up operation.

One particularly expedient structural embodiment of the apparatus according to the invention is achieved in that the rotatable disc is disposed on a frame which can be coupled to the filling machine and by which the drawing-up and clipping device is displaceably carried. Preferably, this is achieved in that the frame has guide rods directed parallel with the axis of rotation of the disc, on which rails the drawing-up and clipping device is displaceable by means of ball-bearing bushes. At the same time, it is furthermore advantageous to use as a power drive for the reciprocating movement of the drawing-up and clipping device a double-acting power cylinder operated either on compressed air or hydraulic fluid. Likewise, however, it is equally possible to use for the purpose an electric motor, for example in conjunction with a worm drive, or a solenoid. With the exception of the solenoid which is generally suitable only for relatively short paths, the aforesaid drives enable a man skilled in the art, even without further measures, to retain the drawing-up and clipping device in the above-mentioned intermediate position in which the nozzle does not interfere with operation of the drawing-up and clipping tools.

According to another development of the invention, the rotatable disc can be indexed by a lockable power drive to positions graduated according to the spacing of the nozzles, which can be particularly expediently achieved in that non-rotatably connected to the rotatable disc is a ratchet plate having on its periphery a number of recesses corresponding to the number of nozzles and into which, with its pivoting center under the action of a power cylinder, a spring-loaded pawl adapted for movement along the periphery of the disc can engage, and in that a rigidly mounted locking pawl which can be operated by a further power cylinder is provided which, when this cylinder is operated, engages in recesses on a third disc which is non-rotatably connected to the disc which carries the nozzles. Such a power drive for indexing the disc carrying the nozzles saves not only on human labor and accelerates indexing to the next position, but it also provides a particularly simple manner of ensuring that the power drive for the reciprocating movement of the drawing-up and clipping device and the power drive for indexing the disc are so locked in respect of each other that the disc can rotate only in the released position of the drawing-up and clipping device and this device can only move into the operating position when the power drive for indexing the disc is locked. This reliably avoids an incorrect operation of the apparatus which might lead to considerable damage and hence prolonged stoppage.

Finally, according to a particular feature of the invention, complete utilization of the advantages of the apparatus according to the invention can be achieved by the power drive for the reciprocating movement of the drawing-up and clipping device, the power drives for operating this device, the power drives for indexing the disc carrying the nozzles and the drive of the filling machine are so sequence-controlled by mechanically operable control elements that the working steps necessary for sausage manufacture, namely the releasing and rotation of the disc carrying the nozzles, locking it again, displacing the drawing-up and clipping device into the working position, switching on the filling machine, switching it off once the desired filling quantity is reached, if necessary retracting the drawing-up and clipping device to the intermediate position, drawing-up and clipping off the filled sausage casing and finally retracting the drawing-up and clipping device into the release position for the duration of such a working cycle and/or a continued repetition thereof take place automatically. The location of the appropriate control elements, their actuation and also their selection in the form of mechanically operable valves or electrical limit switches will be readily evident to a man skilled in the art, on the basis of his technical knowledge.

The invention is explained in greater detail hereinafter with reference to the attached drawings, in which.

Figure 1:
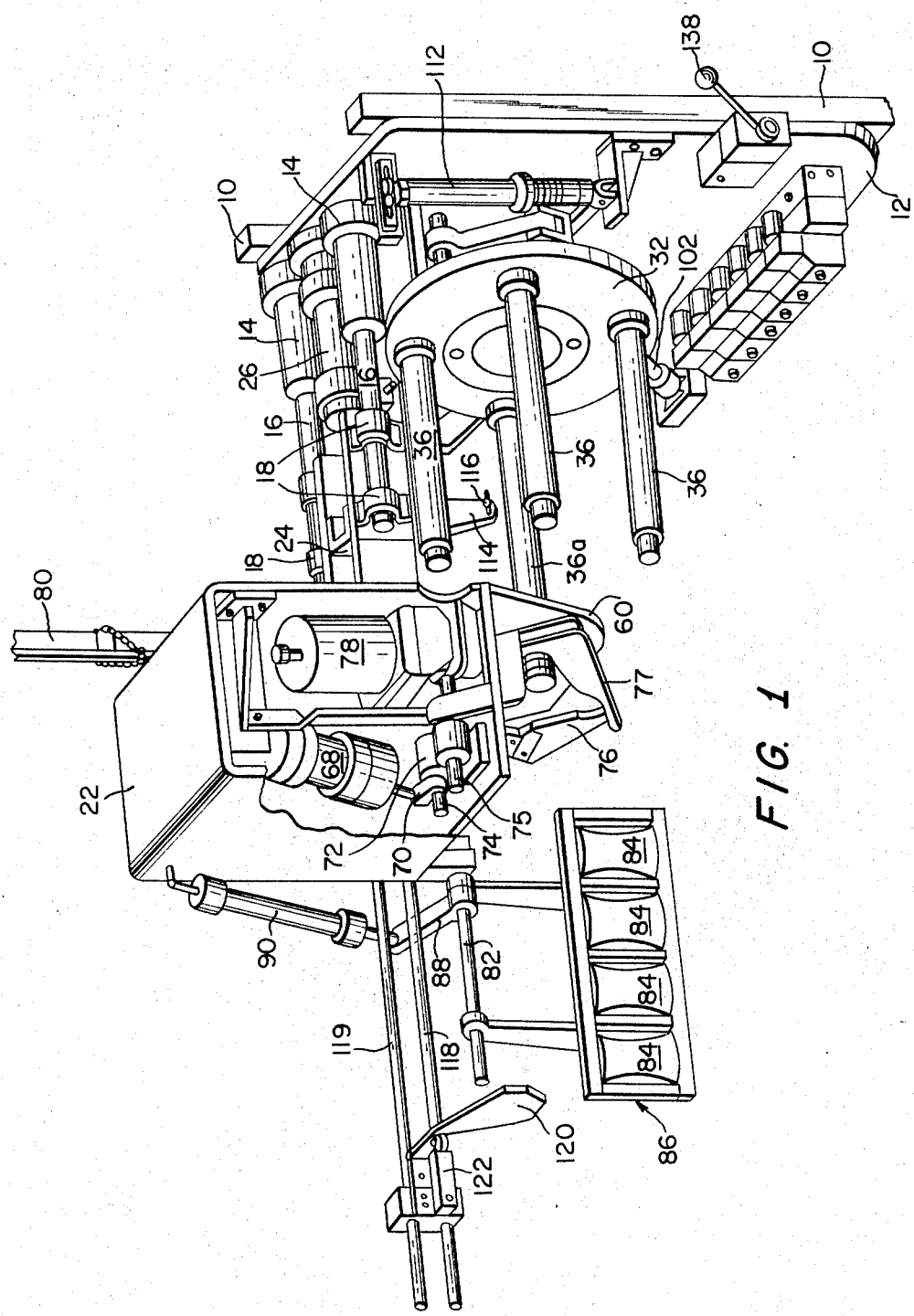
FIG. 1 shows a preferred exemplary embodiment of an apparatus according to the invention in a perspective and largely diagrammatic view, without the filling machine.
Figure 2:
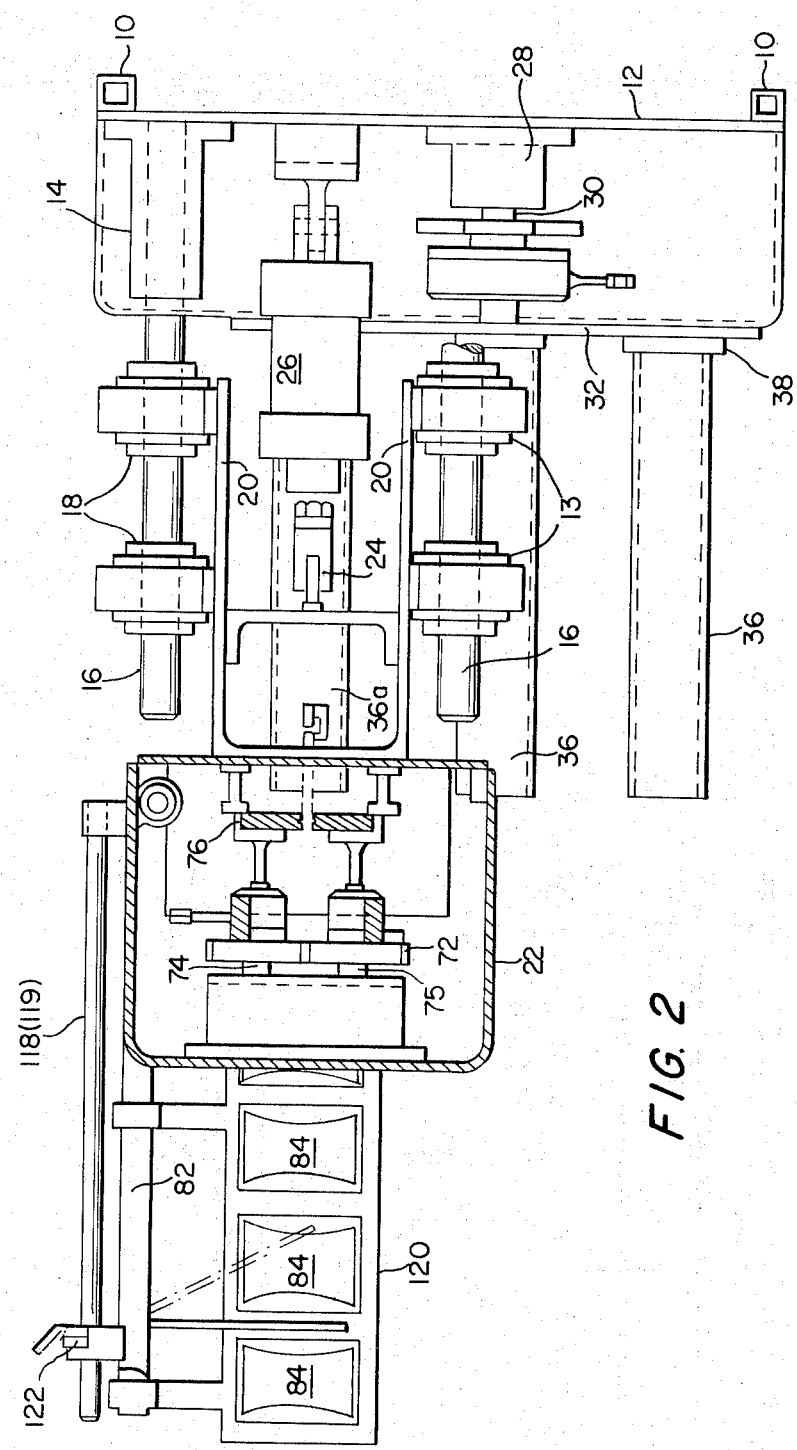
FIG. 2 is a plan view of the apparatus shown in FIG. 1.
Figure 3:
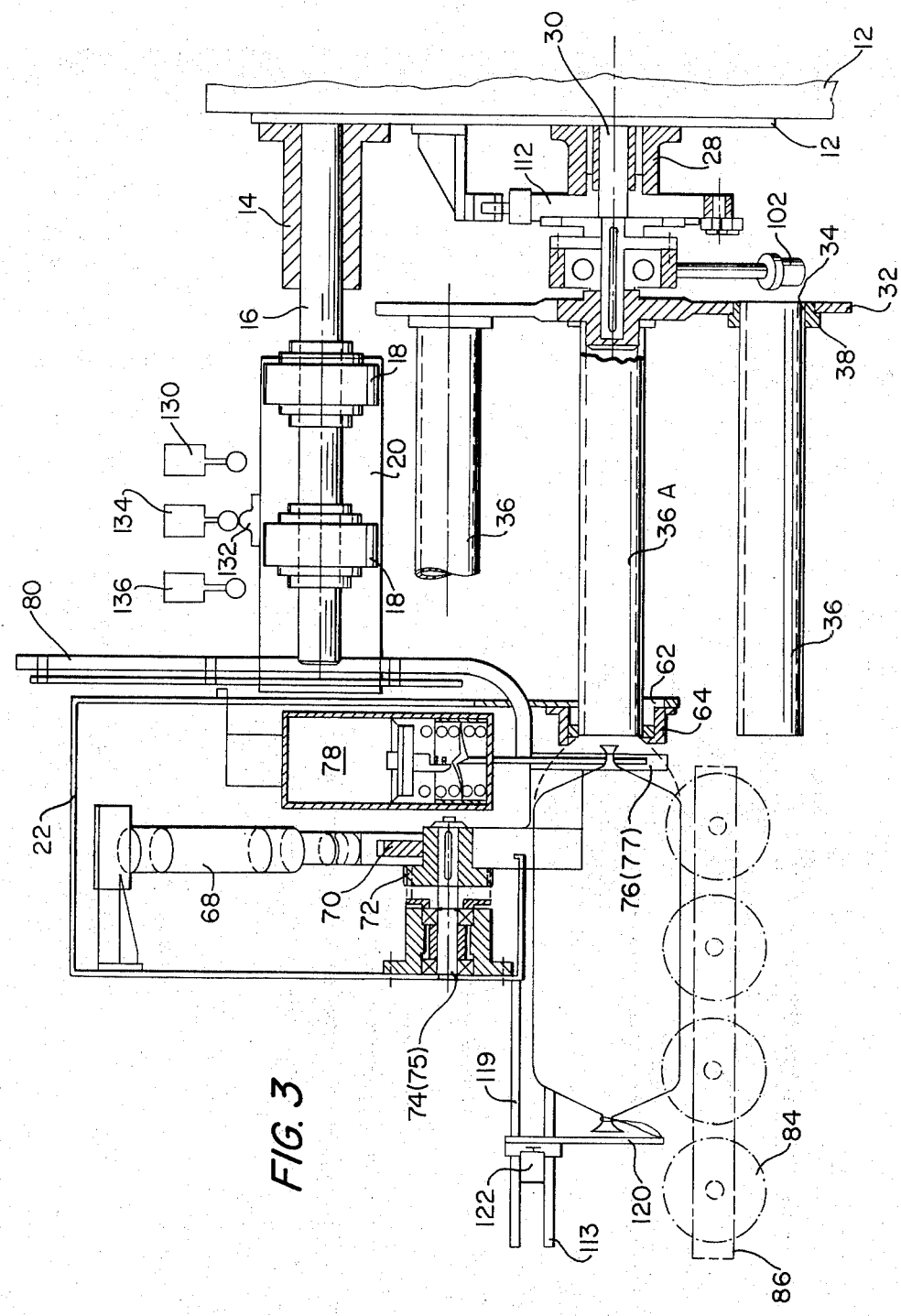
FIG. 3 is a side view thereof.

According to the illustrations in FIGS. 1 to 3, apparatus according to the invention comprises a frame 10 indicated only by two vertical members, on which an upright baseplate 12 is preferably vertically adjustably secured. On the upper edge of the plate 12, two guide rods 16 on which two parallel support arms 20 are mounted for displacement by means of ball-bearing bushings 18, are mounted at the same height and with a transverse spacing, by means of brackets 14. The support arms 20 carry a housing 22 containing a drawing-up and clipping device, to be explained in greater detail hereinafter. At a distance from the housing 22, the support arms 20 are furthermore connected to each other by a cross-member 24 on which the piston of a preferably compressed-air-operated power cylinder 26 engages, its other end being secured to the baseplate 12.

As can be seen particularly in FIGS. 2 and 3 there is also overhung-mounted on the baseplate 12 by means of a sliding friction bearing 28 a circular disc 32 located on a shaft 30. The disc 32 is provided at identical peripheral spacings with, for example, four eccentric apertures 34 in which nozzles 36 extending parallel with shaft 30 are inserted and locked by screwed-on cap nuts 38. For adaption to various thicknesses of sausage to be manufactured, the nozzles can be easily exchanged in this way.

Figure 4:
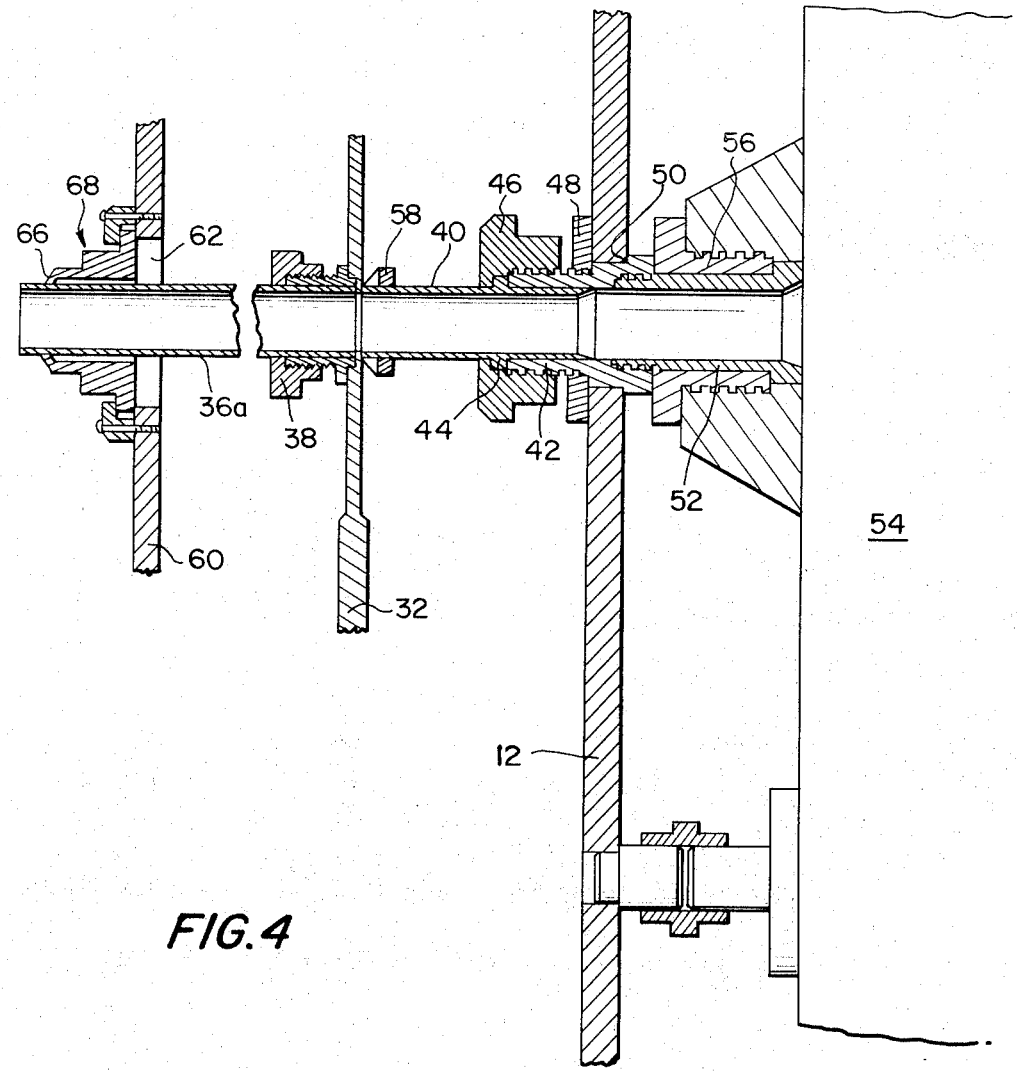
FIG. 4 is a vertical longitudinal section through the outlet of the filling machine and a nozzle with casing brake connected thereto.

As FIG. 4 shows, the nozzles 36 can, by rotation of the disc 32, be brought one after another into alignment with a fixed filling tube 40 which is inserted into a threaded bush 42 which passes through a bore in the baseplate 12 and is immovably held by a cap nut 46 engaging over a collar 44. A disc nut 48 clamps the plate 12 against a shoulder 50 at the other end of the bush 42 by which the bush 42 is connected through a screwed-in intermediate tube 52 to the outlet orifice of a filling machine 54 and is secured therein by means of a flange bush 56.

Thus, the filling pipe 40 forms the virtually extended outlet of the filling machine 54 and carries at its free end a conical packing 58 made from wear-resistant plastic, on which the disc 32 slides as it rotates. The filling pipe 40 is preferably located at the same height as the disc shaft 30 beneath the power cylinder 26, so that the nozzle 36a which is in alignment with it projects centrally towards the downwardly extended end wall 60 of the housing 22 which is at this location provided with a circular aperture 62 (FIG. 4). Coaxial with the aperture 62, there is bolted against that side of the end wall 60 which is remote from the nozzle a per se known casing holder 64 which consists of a synthetic plastic sleeve having an annular lip 66 directed substantially radially inwards. Upon displacement of the housing 22 by the power cylinder 26 in the direction of the filling machine 54, the annular lip 66 of the casing holder 64 engages over the front end of the nozzle 36a which is connected to the filling pipe 40 so that a sausage casing which has previously been pulled onto the nozzle is held fast between the outer face of the nozzle 36a and the annular lip 66 of holder 64 with a force which can be overcome only by a correspondingly high filling pressure of the filling machine 52 which is sufficient for perfect filling of the casing.

Two shafts 74, 75 which are mounted inside the housing 22 and which are, by reason of a double-acting power cylinder 68, rotatable in opposite directions to each other through a lever 70 and a pair of gears 72, carry two scissor-wise inter-engaging drawing-up jaws 76, 77 which are capable of closing immediately adjacent the casing holder 64 and, in the closed state, form the lower part of the path of a clipping stamp which can be driven by a power cylinder 78 and which, when the power cylinder 78 is operated, presses down the metal clips which are supplied in known manner on a guide rail 80 and the arms of the clips engage around the sausage casing which is drawn up tight between the drawing-up jaws 76, 77 and are pressed over against a die (not shown) located at the drawing-up jaws.

Mounted on a spindle 82 on the other end face of the housing 22 is a supporting device 86 provided with rollers 84 and which, by means of a single-acting power cylinder 90 which engages on a lever 88, can be brought into a raised position in which it supports from below the sausage which is pushed forwards between the drawing-up jaws 76, 77 while the nozzle 36a is filling the casing. After drawing-up and clipping, the cylinder 90 is vented and the supporting device 86 places the sausage down on a supporting surface (not shown) located below support 86.

Figure 5:
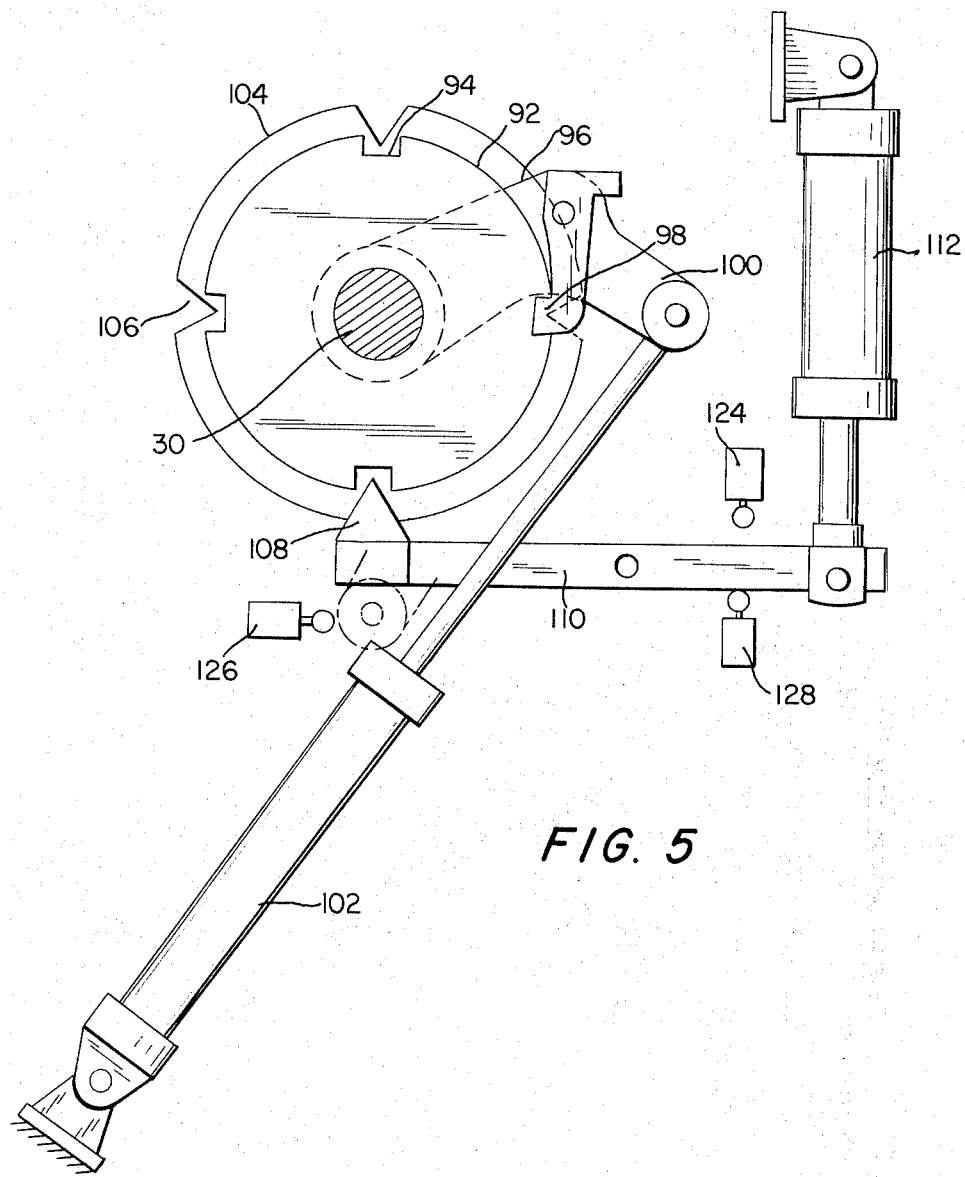
FIG. 5 is a cross-section taken along the line V—V in FIG. 3 with the indexing and locking means for the disc carrying the nozzles.

For mechanical indexing of the disc 32 carrying the nozzles 36, a lockable shift gear mechanism shown in FIGS. 3 and 5 is provided. This consists of a ratchet plate 92 mounted on the shaft 30 and having on its periphery and in a number corresponding to the number of bores 34, rectangular recesses 94 into which a drive pawl 98 articulated on a guide lever 96 is capable of engaging under the action of a spring (not shown). The guide lever 96 is freely pivotable about the shaft 30 and has a projection 100 on which the piston rod of a double-acting power cylinder 102, articulated at its other end on the baseplate 12, engages. Retraction of the power cylinder 102 causes the guide lever 96 to be pivoted by the angle of separation of the recesses 94, in other words in the case of four recesses corresponding to four nozzles on the disc 32, through 90°, the pawl 98 driving the ratchet plate 92 and so indexing the disc 32 with the nozzles 36 by the amount of such separation. Upon extension of the power cylinder 102, the drive pawl 98, by virtue of the position of its pivot point, automatically disengages from the recess 94 and runs freely over the periphery of the ratchet plate 92 and finally, when it reaches the next recess 94, snaps into engagement therewith.

In order to reliably avoid entraining the disc 92 upon return travel of the pawl 98 and at the same time to guarantee an accurate alignment of the nozzle 36a which is in the filling position with the filling pipe 40, the shaft 30 has a locking disc 104 with preferably wedge-shaped recesses 106 into which the wedge-shaped end 108 of a double-armed lever 110 can engage under the action of a power cylinder 112 articulated on the other end of the lever. Instead of the wedge-shaped end 108, it is also possible to use a wheel mounted on the lever 110. Also, the power cylinder 112 can if necessary be replaced by a spring which, under the action of the torque exerted by the power cylinder 102 on the disc 104, yields with a correspondingly great wedge angle of the recesses 106 and, at the end of the rotary movement, by engagement of the lever end 108 into one of the recesses 106, automatically brings the disc into a position of exact alignment of the nozzle 36a with the filling pipe 40.

In spite of the plastic seal 58, however, the alignment of the nozzle 36a with the filling pipe 40 is not sufficient to prevent the highly pressurized sausage mixture emerging at the seal. Inevitable clearance in the mounting of the shaft 30 and also the bending elasticity of the disc 32 lead to a widening of the seal gap through which the sausage composition can then exude. In order to avoid this, there is mounted on one of the support arms 20 a bending-resistant arm 114 which carries at its bottom end an adjustable stop screw 116. Upon retraction of the power cylinder 26 and hence upon pushing of the casing brake 64 onto the nozzle 36a, the stop screw 116 runs as far as it will go towards the edge of the disc 32 immediately alongside the nozzle 36a, the nozzle pressing the disc 32 against the seal 58. By the fact that the power cylinder 26 is also subsequently maintained under pressure, the force of application is maintained throughout the entire filling process.

The apparatus described operates as follows:

Let it be assumed that a sausage casing made from synthetic or natural intestine and already sealed at one end is pushed onto the lowest nozzle 36 as far as it will go, the nozzle being pushed towards the closed end of the casing, and that furthermore, the piston of the power cylinder 26 is in the extended position in which the casing holder 64 has released the nozzle 36a. Now the wedge-shaped end 108 of the lever 110 is disengaged from the corresponding recess 106 of the locking disc 104 by operation of the power cylinder 112, and then the power cylinder 102 is so operated that, via the guide lever 96 and the drive pawl 98, it indexes the ratchet plate 92 and with it the plate 32 carrying the nozzle 36 on by the angle by which the nozzles are separated. By subsequent renewed operation of the power cylinder 112 in the opposite direction, the lever end 108 engages into a recess 106 located upstream of it on the locking disc 104 and secures this and hence also the disc 32 carrying the nozzles, guaranteeing an accurate alignment between the nozzle 36a and the filling pipe 40 in this position.

As soon as the lever end 108 has engaged into the recess 106, pressure is applied to the front part of the power cylinder 26 whereupon this power cylinder exerts traction on the housing 22 in the direction of the filling machine 54, so bringing the drawing-up and clipping device with the casing holder 64 into the working position shown in FIG. 4. When this happens, the sealing lip 66 of the casing holder 64 grips the sausage casing which is drawn onto the nozzle 36a and pulls its closed end taut against the nozzle edge.

The sausage filling machine is now switched on and the sausage mixture is pressed through the intermediate pipe 52, the filling pipe 40 and the nozzle 36a into the sausage casing which, under the pressure of the sausage mixture, against the holding force of the casing holder 64, is pushed off the nozzle 36a, through the drawing-up jaws 76, 77 over the rollers 84 of the supporting device 86. A stop lever 120 articulated for lengthwise displacement on two rods 118, 119 and by which any desired length portioning of the sausage can be adjusted, is finally pivoted against a limit switch 122 which switches off the filling machine 54. If the casing holder 64 is pushed onto the nozzle 36a sufficiently for the nozzle end to be in the pivoting range of the drawing-up jaws 76, 77, the power cylinder 26 is now operated until the pivoting range of the drawing-up jaws is clear of the nozzle and, by operation firstly of the power cylinder 68 and then of the power cylinder 78, the sausage casing which is held firmly on the nozzle 36a by the casing holder 64 can be drawn up and clipped off.

Now, renewed operation of the power cylinder 26 causes the drawing-up and clipping device to run fully back into the release position in which the end wall 60 releases the nozzle 36a and the afore-described working cycle begins anew. Simultaneously with the return of the drawing-up and clipping device to the release position, the power cylinder 90 is also vented and the support device 86 swings down and lays the completed sausage on a depository surface underneath. The raising of the supporting device 86 by renewed operation of the power cylinder 90 expediently takes place simultaneously with the forward movement of the drawing-up and clipping device into the working position.

During the afore-described working cycle, there is sufficient time to pull empty sausage casings onto the other nozzles 36. This work can be carried out by a single machine operator if the pattern of the working cycle is automatically controlled. For this purpose, in addition to the afore-mentioned limit switch 122, further control elements in the form of electrical limit switches or mechanically operable valves are provided as follows. A first control element 124 is operated by the lever 110 pivoting into the release position and switches on the power cylinder 102. A control element 126 is operated at the end of the pivoting movement of the guide lever 96 and switches the power cylinder 112 over into the locked direction. A control element 128 switches on the power cylinder 26 and hence moves the drawing-up and clipping device with the casing brake into the working position. A limit switch 130 which is actuated by a switching cam 132 on one of the support arms 20 switches on the filling machine 54 until the closed end of the filled sausage casing strikes the stop lever 120 and operates the limit switch 122 for switching off the filling machine. As already mentioned, simultaneously with the switching-off of the filling machine, pressure is applied to the rear part of the power cylinder 26 so that this moves the drawing-up and clipping device away from the baseplate 12 until the switching cam 132 encounters a further limit switch 134 by which the power cylinder 26 is temporarily stopped and at the same time the drawing-up and clipping device is opened up by successive operation of the power cylinders 68 and 78. A limit switch (not shown) on the drawing-up and clipping devices switches the power cylinder 26 on again and causes movement of the drawing-up and clipping device into the release position where the switching cam 132 encounters a third limit switch 136 which produces venting of the power cylinder 90 for the support device 86 and prepares the apparatus for a fresh working cycle. This is triggered by movement of a hand lever 138 by which the power cylinder 112 is operated in the release direction. By engaging the hand lever 138 in the release position, the working cycle can be continuously repeated, which is dependent only upon whether during the filling process, the operator has sufficient time to be able always to pull a fresh sausage casing onto a nozzle.

As will be seen from the foregoing description of the mode of action, one particular feature of the apparatus according to the invention resides inter alia in the fact that with alternated operation, there is an alternating control between the sausage filling machine and the filling apparatus. It will be readily understood that, regardless of whether they are constituted by electrical limit switches or mechanically operated valves, the individual control elements must be augmented by additional control elements by which the period for which the individual power cylinders are switched on can be controlled and the power cylinders themselves can if necessary be correspondingly interlocked with one another.

I claim:

1. Apparatus for filling sausage casings with sausage filler comprising: outlet means for introducing sausage filler into a sausage casing; a plurality of elongate nozzle members mounted for movement in a path; means for moving said nozzles in said path to position a nozzle inlet of successive nozzles in alignment with said outlet means for introducing said sausage filler into said nozzle; casing sealing means for sealing an open end of said sausage casing and movable longitudinally of said positioned nozzle between a first position towards said nozzle inlet and a second position away from said nozzle inlet; means for moving said casing sealing means between said first and second positions; and abutment means responsive to motion of said casing sealing means to urge said nozzle inlet against said sausage filler outlet when said casing sealing means is moved into said first position whereby sausage filler is prevented from leakage between said outlet and inlet.

2. Apparatus according to claim 1 wherein the distance between the first and second positions of said casing sealing means is adjustable.

3. Apparatus according to claim 1 further including holding means for holding a casing on said nozzle, said holding means being connected to said sealing means for motion therewith, and wherein said casing sealing means is positionable in a third position intermediate said first and second positions in which intermediate position said holding means engages said nozzle and said nozzle is clear of said sealing means.

4. Apparatus according to claim 1 further including a frame and wherein said nozzles are carried by a rotatable disc mounted for rotation on said frame and wherein said sealing means is mounted for movement on said frame relative to said disc.

5. Apparatus according to claim 4 wherein said frame includes elongate guide rod means for slideable movement of said sealing means, the longitudinal axis of said guide rod means being parallel to the longitudinal axes of said nozzles.

6. Apparatus according to claim 4 wherein said sealing means is mounted on said frame for reciprocal movement relative to said frame, said means for moving said casing cylinder means comprising a double acting power cylinder.

7. Apparatus according to claim 4 wherein said nozzle moving means comprises means for indexably rotating said disc to sequentially position said nozzles in alignment with said outlet means.

8. Apparatus according to claim 7 wherein said means for indexably rotating said disc comprises a ratchet plate secured to said disc and provided at its periphery with a plurality of recesses corresponding to the number and angular spacing of said nozzles, pawl means engageable with said recesses and moveable along the periphery of said ratchet plate, means for moving said pawl means in engagement with a recess to rotate said disc to position said nozzles in alignment with said outlet means, a further ratchet plate secured to said disc and provided at its periphery with a plurality of recesses corresponding to the number and angular spacing of said nozzles; a rigidly mounted locking pawl engageable in the recesses of said further ratchet plate, and means for moving said locking pawl in said recesses on said further ratchet plate to lock said nozzle in position in alignment with said outlet means.

9. Apparatus according to claim 7 wherein said means for moving said sealing means and said means for rotating said disc are interconnected such that rotation of said disc is possible only when the sealing means is in said second position and movement of said sealing means into said first position is possible only when one of said nozzles is positioned in alignment with said outlet means.

10. Apparatus according to claim 9 wherein the apparatus further comprises means for moving sausage filler through said outlet means and wherein said means for moving said sealing means, said means for moving said nozzles and said means for moving sausage filler are sequentially controlled by automatic control elements such that operation of the apparatus is automatic.

* * * * *